United States Patent [19]
Davis

[11] Patent Number: 5,947,106
[45] Date of Patent: Sep. 7, 1999

[54] BARBECUE GRILL AND FIREPLACE ASH CRADLE ASSEMBLY

[76] Inventor: Valerie J. Davis, 27630 Onyx La., Castaic, Calif. 91384

[21] Appl. No.: 09/174,610

[22] Filed: Oct. 19, 1998

Related U.S. Application Data

[62] Division of application No. 08/820,988, Mar. 19, 1997, abandoned.

[51] Int. Cl.⁶ ..................................................... A47J 37/00
[52] U.S. Cl. ......................... 126/25 R; 126/9 R; 126/242
[58] Field of Search ............................... 126/25 R, 25 B, 126/242–245, 9 R

[56] References Cited

U.S. PATENT DOCUMENTS

| | | | |
|---|---|---|---|
| 3,611,915 | 10/1971 | Glaser | 126/25 R |
| 4,281,633 | 8/1981 | Wackerman | 126/25 R |
| 4,436,081 | 3/1984 | Hefling | 126/245 |
| 4,497,308 | 2/1985 | Johnson | 126/242 |
| 5,540,212 | 7/1996 | Stroud | 126/25 R |

*Primary Examiner*—James C. Yeung

[57] ABSTRACT

A barbecue grill and fireplace ash cradle assembly is provided for capturing hot ash being released from a burning material. The barbecue grill is equipped with a hemispherical configuration and an open top face. Also included is a kettle member removably situated within the barbecue grill for catching ash therein, wherein the kettle member has a shape similar to that of the barbecue grill.

1 Claim, 3 Drawing Sheets

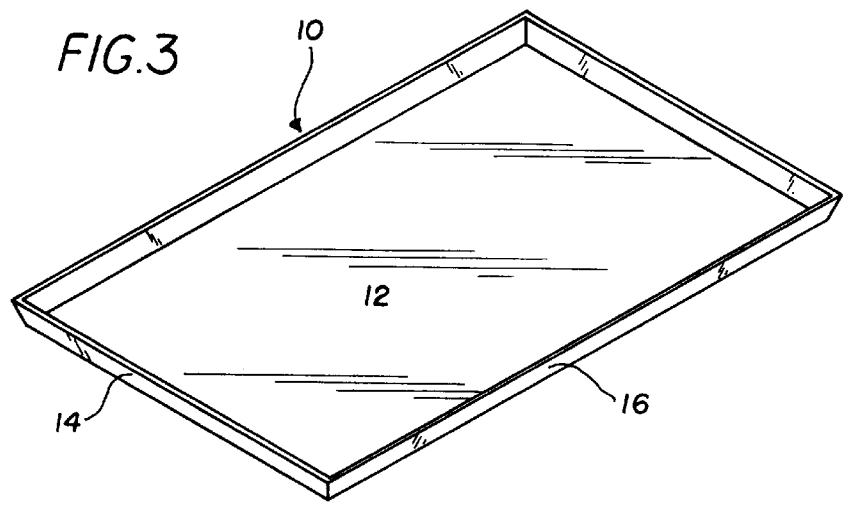
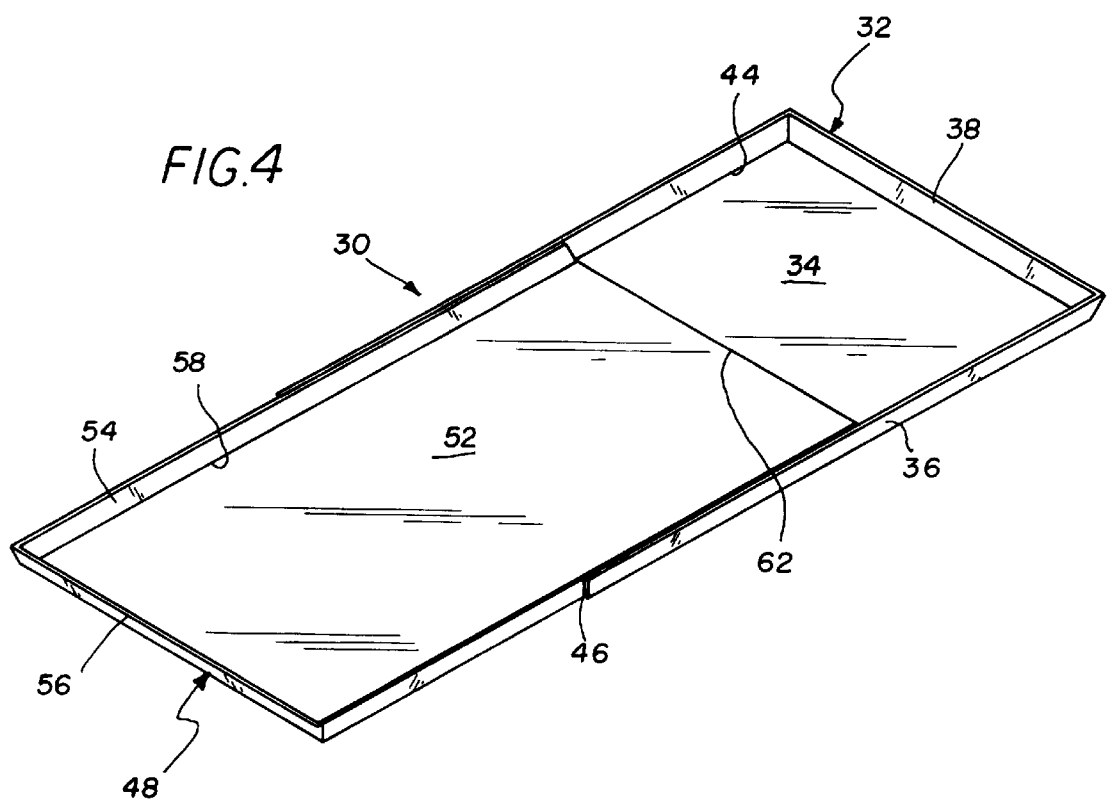

BARBECUE GRILL AND FIREPLACE ASH CRADLE ASSEMBLY

CROSS-REFERENCE TO RELATED APPLICATION

This application is a divisional application of Ser. No. 08/820,988, filed Mar. 19, 1997, abandoned.

BACKGROUND OF THE INVENTION

1. Field of the Invention

The present invention relates to a barbecue grill and fireplace ash cradle assembly and more particularly pertains to providing an ash cradle for capturing spent wood, charcoal and other material burned for heating and cooking.

2. Description of the Prior Art

The use of an ash catch is known in the prior art. More specifically, ash catches heretofore devised and utilized for the purpose of catching ashes are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. Des. 355,566 to Stephen and Schlosser discloses a combined leg support and ash catcher for an outdoor cooker. U.S. Pat. No. 5,036,832 to Schlosser and Alden discloses an ash catcher assembly for a barbecue grill. U.S. Pat. No. 4,763,640 to Shnack and Wilson discloses a barbecue grill ash collector. U.S. Pat. No. 4,741,322 to Lin discloses an ash catch tray for a barbecue kettle. U.S. Pat. No. 4,706,648 to Blount, Exum and Wooten discloses an ash catcher for a fireplace insert. Lastly, U.S. Pat. No. Des. 278,021 to Schlosser and Stephen discloses a combined leg support and ash catcher for an outdoor cooker or similar article.

In this respect, the barbecue grill and fireplace ash cradle assembly according to the present invention substantially departs from the conventional concepts and designs of the prior art, and in so doing provides an apparatus primarily developed for the purpose of providing an ash cradle for capturing spent wood, charcoal and other material burned for heating and cooking.

Therefore, it can be appreciated that there exists a continuing need for a new and improved barbecue grill and fireplace ash cradle assembly which can be used for providing an ash cradle for capturing spent wood, charcoal and other material burned for heating and cooking. In this regard, the present invention substantially fulfills this need.

SUMMARY OF THE INVENTION

In view of the foregoing disadvantages inherent in the known types of ash catchers now present in the prior art, the present invention provides an improved barbecue grill and fireplace ash cradle assembly. As such, the general purpose of the present invention, which will be described subsequently in greater detail, is to provide a new and improved barbecue grill and fireplace ash cradle assembly which has all the advantages of the prior art and none of the disadvantages.

To attain this, the present invention essentially comprises a pan or kettle formed of a heat treated material. The pan has a base member, a pair of short side walls and a pair of long side walls. The base member has peripheral end edge therearound. The pair of short side walls and the pair of long side walls are interconnected to the base member. The pair of short side walls project outwardly from the applicable peripheral end edge along about a 120 degree angle. The pair of long side walls project outwardly from the applicable peripheral end edge along about a 120 degree angle. The kettle member of the present invention has an upper rim therearound and a lower portion. The lower portion of the kettle member has a pair large openings and a small opening spaced an equal distance from the pair of large openings. The upper rim has a diameter and the lower portion has a diameter ⅓ the diameter of the upper rim. Included is a ring member that has an, upper peripheral edge and a lower peripheral edge. The upper peripheral edge has a plurality of indents proportionately spaced thereabout a plurality of rigid support members are provided. One of each support member has a first end fixedly attached to the lower peripheral edge of the ring. One of each support member has a second end fixedly attached to the upper rim of the kettle. The support member, when attached to the kettle and ring, support the ring above the kettle. The the kettle has a handle member that is rotatably coupled to the kettle and adjacent the upper rim. The handle allows a person to lift the kettle in and out of a barbecue grill. Lastly, a charcoal support member is sized to rest adjacent the upper rim of the kettle. The charcoal support member will support hot charcoal within the kettle and above the lower portion. The charcoal forms a hot ash that falls into the kettle to settling in the lower portion of the kettle, during use of the barbecue grill.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved barbecue grill and fireplace ash cradle assembly which has all the advantages of the prior art ash catchers and none of the disadvantages.

It is another object of the present invention to provide a new and improved barbecue grill and fireplace ash cradle assembly which may be easily and efficiently manufactured and marketed.

It is a further object of the present invention to provide a new and improved barbecue grill and fireplace ash cradle assembly which is of a durable and reliable construction.

An even further object of the present invention is to provide a new and improved barbecue grill and fireplace ash cradle assembly which is susceptible of a low cost of manufacture with regard to both materials and labor, and which accordingly is then susceptible of low prices of sale to the consuming public, thereby making such barbecue grill and fireplace ash cradle assembly economically available to the buying public.

Still yet another object of the present invention is to provide a new and improved barbecue grill and fireplace ash cradle assembly which provides in the apparatuses and methods of the prior art some of the advantages thereof, while simultaneously overcoming some of the disadvantages normally associated therewith.

Still another object of the present invention is to providing an ash cradle for capturing spent wood, charcoal and other material burned for heating and cooking.

Lastly, it is an object of the present invention to provide a new and improved barbecue grill and fireplace ash cradle assembly for capturing hot ash being released from a burning material. The barbecue grill is equipped with a hemispherical configuration and an open top face. Also included is a kettle member removably situated within the barbecue grill for catching ash therein, wherein the kettle member has a shape similar to that of the barbecue grill.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric view of the pan showing the base member and the sides.

FIG. 4 is a perspective illustration of the dual pan system the barbecue grill and fireplace ash cradle assembly constructed in accordance with the principles of the present invention.

Similar reference characters refer to similar parts throughout the several views of the drawings.

DESCRIPTION OF THE PREFERRED EMBODIMENT

Figure 1:
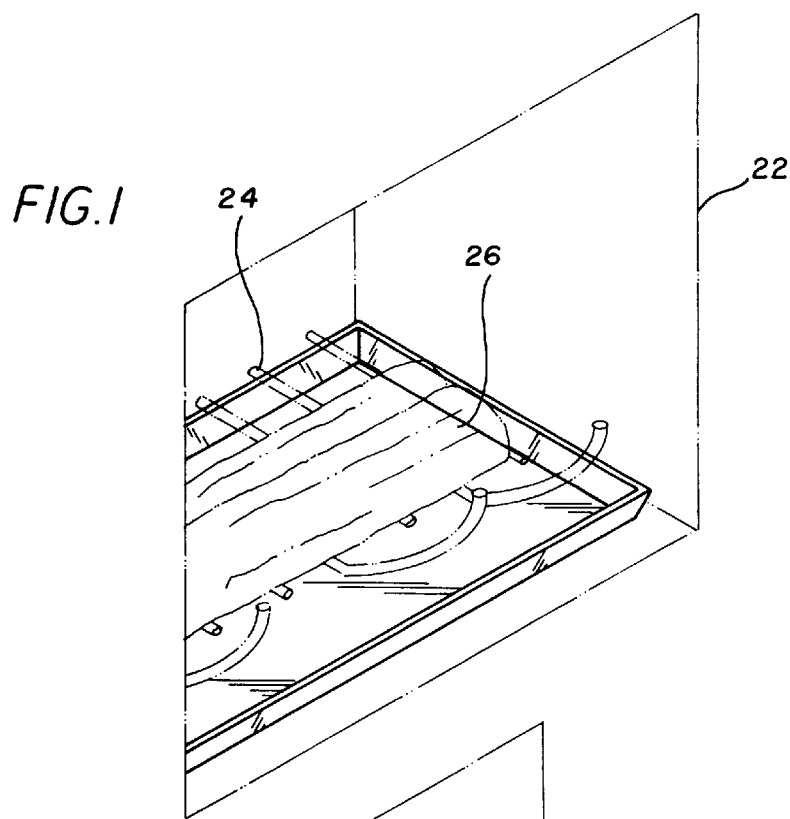
FIG. 1 is a perspective illustration of the pan of the barbecue grill and fireplace ash cradle assembly constructed in accordance with the principles of the present invention.

With reference now to the drawings, and in particular to FIG. 1 thereof, a new and improved barbecue grill and fireplace ash cradle assembly embodying the principles and concepts of the present invention and generally designated by the reference numeral 10 will be described.

The present invention, the new and improved barbecue grill and fireplace ash cradle assembly, is comprised of a plurality of components. Such components in their broadest context include a pan and a kettle. Such components are individually configured and correlated with respect to each other so as to attain the desired objective.

Figure 2:
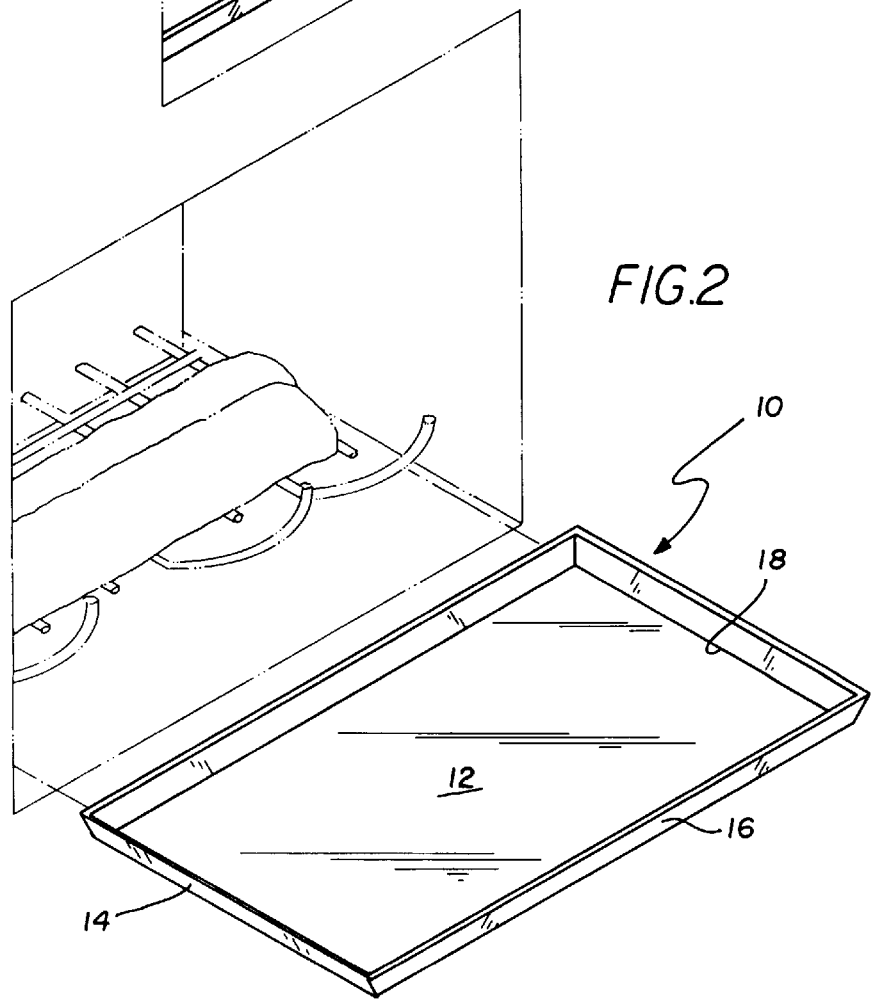
FIG. 2 is an isometric view of the operable orientation of the pan of FIG. 1.

More specifically, it will be noted that the barbecue grill and fireplace ash cradle assembly is comprised of a pan or a kettle. As seen in FIG. 3, a generally rectangular pan 10 is formed of a heat treated material. The pan has a base member 12, a pair of short side walls 14 and a pair of long side walls 16. The base member, as seen in FIG. 2, has peripheral end edge 18. The pair of short side walls and the pair of long side walls are interconnected to the peripheral end edge of the base member. The pair of short side walls project outwardly from the applicable peripheral end edge along about a 120 degree angle. the pair of long side walls project outwardly from the applicable peripheral end edge along about a 120 degree angle.

As best illustrated in FIG. 2, the pair of short side walls are concave away from the base member. The pair of long side walls are concave away from the base member. Concaving of the long and short side walls give the pan a bowl appearance. The pan 10, as seen in FIG. 1, is positioned within a fireplace 22 under a rack 24 that supports a burning log 26 for allowing hot ash to be cradled within. The pair of short side walls and the pair of long side walls, with the concave shape, will retaining the hot ash dropping into the pan for removal from the fireplace when cool.

Also, the pan may be a dual pan assembly 30 that has a first pan and a second pan. The first generally rectangular pan 32 is formed of a heat treated material. The first pan has a first base member 34, a first pair of long side walls 36 and a first short side wall 38. The base member has a first peripheral end edge 44 therearound.

Additionally, the first short side wall 38 and the first pair of long side walls 36 are interconnected to the peripheral end edge of the first pan. The first base member has a first open end 46 formed along the first peripheral end edge symmetrically opposite the first short side wall, as shown in FIG. 4. The first short side wall projects outwardly from the applicable peripheral end edge along about a 120 degree angle. The first pair of long side walls projects outwardly from the applicable peripheral end edge along about a 120 degree angle.

Included is a second generally rectangular pan 48. The second pan is formed of a heat treated material and sized for positioning within the first pan. The second pan has a second base member 52, a second pair of long side walls 54 and a second short side wall 56. The second base member has a second peripheral end edge 58. The second short side wall and the second pair of long side walls are interconnected to the peripheral end edge. The second base member has a second open end 62 that is formed along the second peripheral end edge symmetrically opposite the second short side wall. The second short side wall projects outwardly from the applicable peripheral end edge along about a 120 degree angle. The second pair of long side walls projects outwardly from the applicable peripheral end edge along about a 120 degree angle.

The first and second pair of short side walls of the first pan 32 and second pan 48, are each concave away from the applicable base member. The first and second pair of long side walls, of the first and second pan, are each concave away from the applicable base member. FIG. 4 shows, the first pan as positioned within the second pan to form a single pan. The single pan is capable of increasing and decreasing in width. When the single pan is positioned within a fireplace under a burning log for allowing hot ash to be cradled therein. The first and second pair of short side walls and the first and second pair of long side walls, with the concave shape, are capable of retaining the hot ash dropping into the single pan for removal from the fireplace when cool.

An alternative to the rectangular shape barbecue grill and fireplace ash cradle assembly is the kettle shape 64 for the a barbecue assembly. Included in the alterative embodiment is a kettle member 66. The kettle member has an upper rim 68 therearound, an upper portion and a lower portion 72. The lower portion has a circular, planar bottom face and an arcuate side wall. Such arcuate side wall has a cross-section which defines a quarter of a circle. Integrally mounted an upper peripheral edge of the lower portion is the upper portion that also has a cross-section which defines a quarter of a circle. By this structure, an outer surface of the kettle member has a pair of annular, concentric undulations of a common height. In the preferred embodiment, the kettle member is formed of heat treated material.

Figure 5:
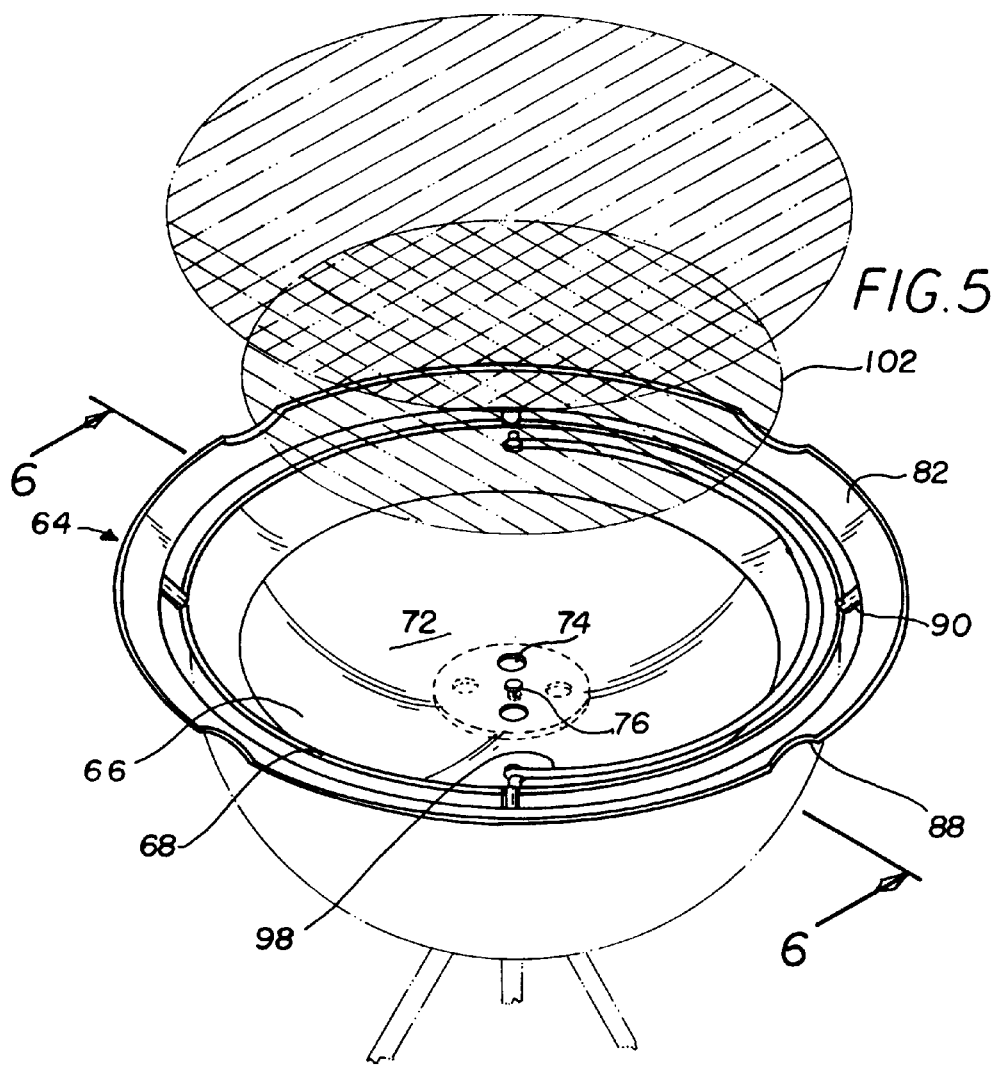
FIG. 5 is a perspective illustration of the kettle system of the barbecue grill and fireplace ash cradle assembly constructed in accordance with the principles of the present invention.

As shown in FIG. 5, the lower portion of the kettle member has a pair large openings 74 and a small opening 76 spaced an equal distance from the pair of large openings. Attached to the lower portion of the kettle member is an apertured vent cover 78. The vent cover rotates about a rivet 80 within the small opening to control the air flow through the large openings of the lower portion.

Also included is a ring member 82. The ring member has an upper peripheral edge 84 with a diameter which is greater than that of a lower peripheral edge 86 which in turn has a diameter that is greater than the upper rim of the kettle member. The upper peripheral edge of the rim member has a plurality of semicircular indents 88 proportionately spaced therearbout. In the preferred embodiment, the ring member defines a portion of a cone.

Figure 6:
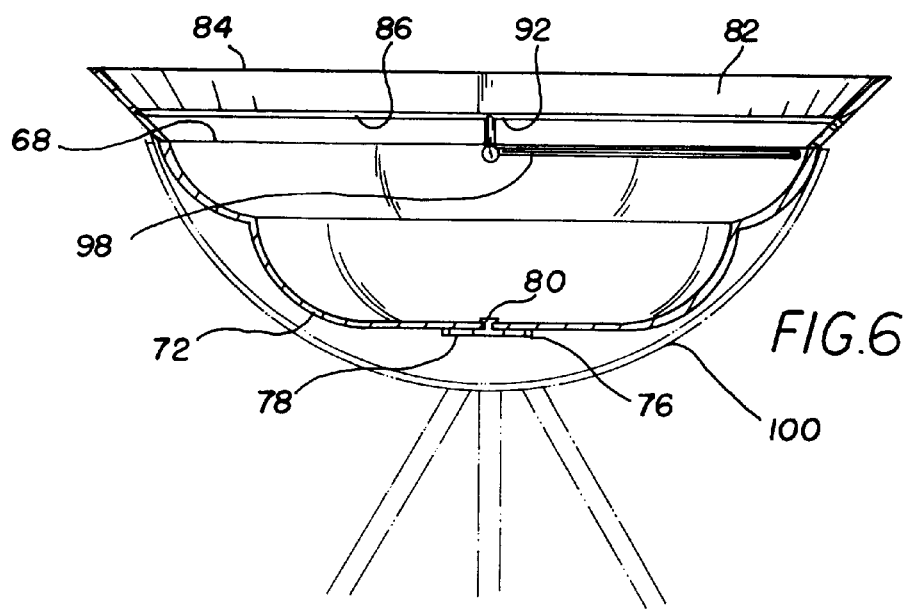
FIG. 6 is a cross-sectional view of the kettle of FIG. 5.

For coupling the lower peripheral edge of the ring member to the upper rim of the kettle member, a plurality of rigid support members 90 are provided. Each support member has a first end 92 that is fixedly attached to the lower peripheral edge 86 of the ring member. Each support member further has a second end 94 that is fixedly attached to the upper rim 68 of the kettle member. The support members, when attached to the kettle member and ring, support the ring member above the kettle member, as shown in FIG. 6. This affords an annular air vent which circumnavigates the kettle member.

Additionally, a U-shaped handle member 98 is rotatably coupled to an inner surface of the kettle member adjacent the upper rim, as shown in FIG. 6. Preferably, the handle member defines a circumference which is half that of the upper rim of the kettle member. The handle member allows a person to lift the kettle member in and out of a barbecue grill 100. When the kettle member is situated within the barbecue grill, the upper rim of the kettle member remains flush with an upper edge of the barbecue grill and the support members rest on the upper edge of the barbecue grill.

Finally, a charcoal support member 102, or grill, is included. The charcoal support member is sized to rest on the upper rim 68 of the kettle. The charcoal support member supports hot charcoal within the kettle member above the upper and lower portions. As the charcoal burns hot ash is formed and falls into the kettle member, settling in the lower portion of the kettle during use of the barbecue grill.

The present invention barbecue grill and fireplace ash cradle assembly provides an easy way to clean up a dirty fireplace and or barbecue pit. When used with a fireplace, the pan or the dual pan system is placed under the wrack in the fireplace. When used with a barbecue pit the kettle member is placed within the kettle portion of the barbecue pit. The pan, dual pans and kettle member have each made of material that has been heat treated to withstand constant heating. Each item eliminates the hassle with trying to clean up loose ashes that are deposited after a material is burned within the fireplace and/or barbecue pit.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved barbecue grill and fireplace ash cradle assembly for capturing hot ash being released from a burning material comprising, in combination:

a kettle member having an upper rim therearound, an upper portion and a lower portion, the kettle member being formed of heat treated material, the lower portion of the kettle member having a pair large openings and a small opening spaced an equal distance from the pair of large opening, the upper portion and lower portion defining a pair of concentric, annular undulations;

a ring member having an upper peripheral edge and a lower peripheral edge therearound, the upper peripheral edge having a plurality of indents proportionately spaced therearbout;

a plurality of rigid support members, each support member having a first end fixedly attached to the lower peripheral edge of the ring, each support member having a second end fixedly attached to the upper rim of the kettle member, the support member when attached to the kettle member and ring member for supporting the ring member above the kettle member to define an annular vent;

a handle member being rotatably coupled to the kettle member to the upper rim, the handle member allowing a person to lift the kettle member in and out of a barbecue grill; and a charcoal support member including a grill being sized to rest adjacent the upper rim of the kettle member, the charcoal support member being capable of supporting hot charcoal within the kettle member, the charcoal forming hot ash that falls into the kettle member to settling in the lower portion of the kettle during use of the barbecue grill.

\* \* \* \* \*